No. 772,212. PATENTED OCT. 11, 1904.
G. W. CAMPBELL & A. C. WILLIAMS.
BRACKET.
APPLICATION FILED DEC. 8, 1903.
NO MODEL.
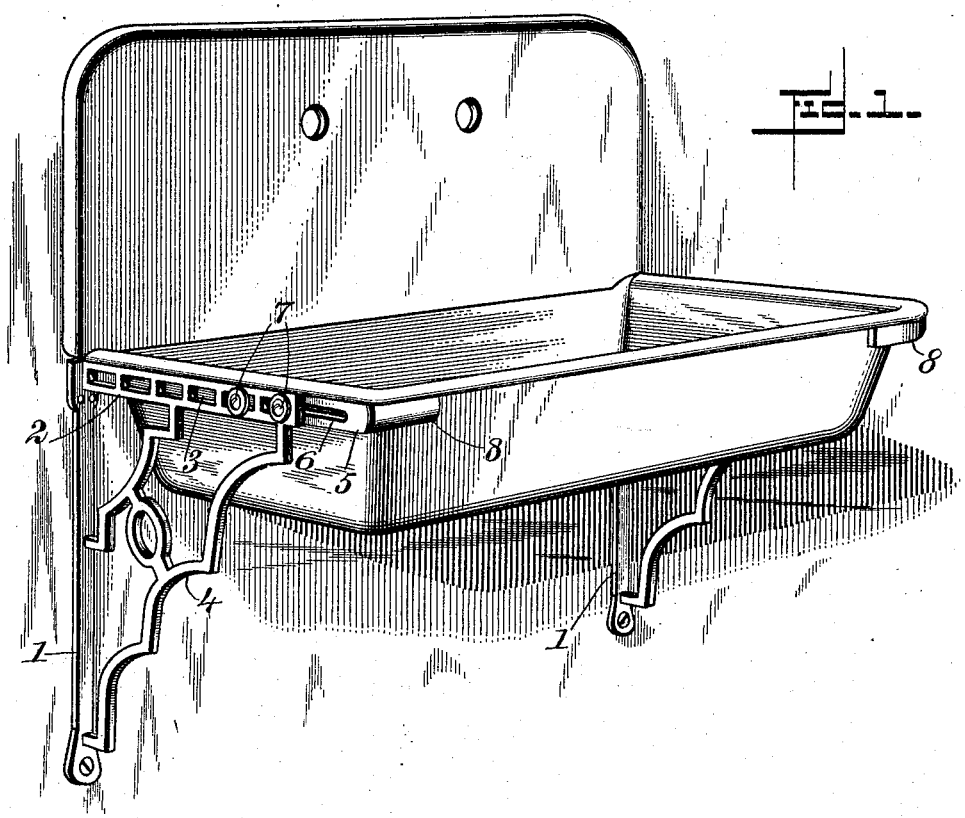
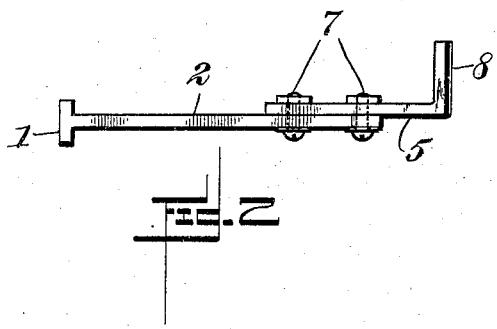
WITNESSES:
INVENTORS
George W. Campbell
Asa C. Williams
BY
ATTORNEYS No. 772,212. Patented October 11, 1904.

UNITED STATES PATENT OFFICE.

GEORGE W. CAMPBELL AND ASA COLEMAN WILLIAMS, OF CHATTANOOGA, TENNESSEE.

BRACKET.

SPECIFICATION forming part of Letters Patent No. 772,212, dated October 11, 1904.

Application filed December 8, 1903. Serial No. 184,257. (No model.)

*To all whom it may concern:*

Be it known that we, GEORGE W. CAMPBELL and ASA COLEMAN WILLIAMS, citizens of the United States, and residents of Chattanooga, in the county of Hamilton and State of Tennessee, have invented a new and Improved Bracket, of which the following is a full, clear, and exact description.

This invention relates to improvements in metal brackets, particularly for supporting metal sinks and the like, an object being to provide a bracket that may be readily adjusted to sinks of different widths and by the use of which the drilling of holes in the sink-rim is obviated. While we have mentioned the bracket as particularly adapted for sinks or the like, it is to be understood that it is equally adapted for supporting shelving.

We will describe a bracket embodying our invention and then point out the novel features in the appended claim.

Reference is to be had to the accompanying drawings, forming a part of this specification, in which similar characters of reference indicate corresponding parts in both figures.

Figure 1 is a perspective view of a sink supported by brackets embodying our invention. Fig. 2 is a plan view of one of the brackets.

Referring to the drawings, 1 designates the back or vertical portion of the bracket, provided with perforations through which fastening-screws or the like may pass, and extended integral therewith from the upper end is a horizontally-disposed upper member 2, provided with a series of openings 3, here indicated as slots. The members 1 2 may be braced by any suitable means, and the invention obviously is not confined to the ornamental design of braces, as indicated at 4.

Mounted to slide lengthwise of the upper member is a supplemental or adjustable member 5, provided with a slot 6, through which fastening screws or bolts 7 may pass, the said screws or bolts also passing through openings in the upper member, whereby the adjustable member may be held rigidly in its adjusted position. The member 5 has at its upper end an inward extension 8, designed to engage underneath the front top flange of the sink, as clearly indicated in Fig. 1, while the end flanges rest on the upper member 2 and also on the portion 5 of the adjustable member.

It is obvious that a bracket embodying our invention will be found very convenient, as it may be readily adjusted to sinks of different widths and of slight variations in widths.

It will be understood that our invention is applicable to various styles of sinks, such as flat or rolled rim and of porcelain, enameled iron, or painted, and that the upper edge of the laterally-extending arm is in alinement with the upper edge of the main or supporting member, so that the sink may be supported throughout the length of the main arm and the lateral arm.

Having thus described our invention, we claim as new and desire to secure by Letters Patent—

A bracket comprising a main or supporting member and a member adjustable horizontally along said main member and having at its outer end a laterally-extending arm to extend along the front side of a sink-body and underlie the front flange of the sink in advance of said body, the upper edge of said arm and the upper edge of the main or supporting member being in alinement whereby the sink may be supported throughout the length of the main arm and the lateral arm substantially as set forth.

In testimony whereof we have signed our names to this specification in the presence of two subscribing witnesses.

GEORGE W. CAMPBELL.
ASA COLEMAN WILLIAMS

Witnesses to the signature of George W. Campbell:
JNO. M. RITTER,
C. R. FERGUSON.

Witnesses to the signature of Asa C. Williams:
E. M. SHEATON,
W. T. WOOD.